United States Patent [19]

Herrington

[11] Patent Number: 4,628,536
[45] Date of Patent: Dec. 9, 1986

[54] BAG HAVING INTERMITTENT ORIENTATION DRAW TAPE AND METHOD OF MAKING

[75] Inventor: Fox J. Herrington, Holcomb, N.Y.

[73] Assignee: Mobil Oil Corporation, New York, N.Y.

[21] Appl. No.: 722,045

[22] Filed: Apr. 11, 1985

[51] Int. Cl.$^4$ ............................................. B65D 33/28
[52] U.S. Cl. ...................................... 383/75; 383/908; 493/203; 493/211; 493/215; 493/225
[58] Field of Search ............... 493/214, 225, 211, 215, 493/199, 200, 201, 203; 383/72, 73, 74, 75, 76, 908

[56] References Cited

U.S. PATENT DOCUMENTS

| | | | |
|---|---|---|---|
| 2,777,491 | 1/1957 | Ashton et al. | 383/75 |
| 3,029,853 | 4/1962 | Piazze . | |
| 3,196,757 | 7/1965 | Samways | 493/225 |
| 3,414,032 | 12/1968 | Jortikka | 383/75 |
| 3,506,048 | 4/1970 | Jortikka | 383/75 |
| 3,547,341 | 12/1970 | Kirkpatrick | 383/75 |
| 3,721,383 | 3/1973 | Dufes | 383/75 |

FOREIGN PATENT DOCUMENTS 1,125,363  8/1968  United Kingdom .

Primary Examiner—Stephen P. Garbe
Attorney, Agent, or Firm—Alexander J. McKillop; Michael G. Gilman; Charles J. Speciale

[57] ABSTRACT

Draw tape bags have a high molecular weight, high density polyethylene draw tape which is intermittently stretched so that the tape has central portions of relatively narrow and thin oriented polyethylene and end portions which are relatively wide and thick. The end portions are heat sealed to the sides of the bag panels to secure them. The stretching makes the tape cost more economical and improves the break characteristics while the thick and wide end portions permit good heat sealing without weakening the draw tape. Also disclosed is a method of making such bags.

14 Claims, 7 Drawing Figures

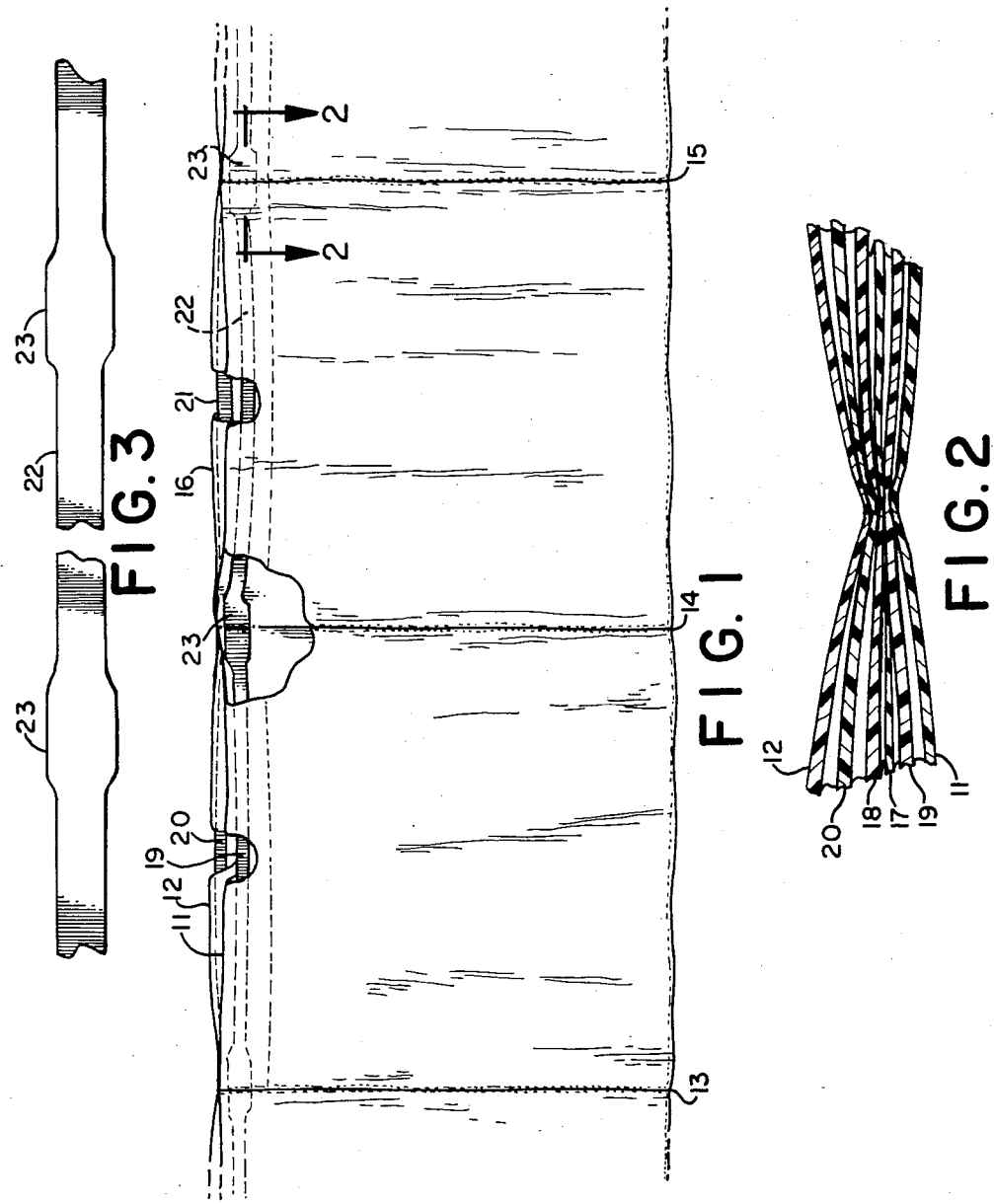

BAG HAVING INTERMITTENT ORIENTATION DRAW TAPE AND METHOD OF MAKING

BACKGROUND OF THE INVENTION

This invention relates to plastic draw tape bags, and more particularly, to an improved draw tape and method of manufacture.

Bags made of thin polyethylene material have been used in various sizes. Small bags are used in the packaging of sandwiches and the like; larger bags are used as shopping bags; and even larger bags are used for containing trash.

A particularly advantageous closure for such a bag includes a draw tape constructed from the same polyethylene material. U.S. Pat. No. 3,029,853—Piazzi, and British Pat. No. 1,125,363—Jortikka are examples of draw tape bags. Such closures have been successively employed on these bags.

Draw tape closures for large trash bags, and the manufacture of these draw tape trash bags, are described in the related applications identified below.

In such bags, the tape is preferably unoriented polyethylene which is heat sealed to the opposing panels of the bag at the sides thereof. The weakest part of the draw tape is at the heat seal. This weak point should be located at the point of lowest tensile load, which is furthest from where the user pulls the tape. For this reason, the tape is normally in a hem with a notch at the center of the bag, so that the user grasps the tape at a point furthest from the heat seal.

Economy of manufacture is one of the prime considerations in these bags. The cost of the draw tape is a significant part of the total bag cost, so that any economies in draw tape cost advantageously reduce the ultimate cost of the bag.

It is an object of the present invention to reduce the cost of the draw tape in a trash bag by significantly stretching the tape prior to insertion into the bag.

It is another object of the present invention to use stretched, oriented, polyethylene tape in a draw tape bag without significantly weakening the heat seal where the tape is secured to the sides of the bag.

RELATED APPLICATIONS

"METHOD & APPARATUS FOR MANUFACTURING DRAW TAPE BAGS", Boyd, et al, Ser. No. 652,254, filed Sept. 20, 1984 describes an overall draw tape bag manufacturing line; "METHOD & APPARATUS FOR FORMING HEMS IN SUPERPOSED PLIABLE PANELS", Boyd et al, Ser. No. 652,255, filed Sept. 20, 1984, describes a hem forming apparatus used with the line; "INSERTION OF DRAW TAPE STRIPS IN DRAW TAPE BAG MANUFACTURE", Boyd, et al, Ser. No. 652,252, filed Sept. 20, 1984, describes the apparatus for inserting the draw tape into the bag. The foregoing applications are incorporated herein by reference.

SUMMARY OF THE INVENTION

In accordance with the present invention, a draw tape for a trash bag has a relatively thin and narrow, stretched, oriented, central portion between thick and wide, unstretched, unoriented, end portions of the tape at the extremeties where each draw tape is secured to the panels of the bag by heat sealing.

In accordance with the present invention, unoriented polyethylene tape is stretched to several multiples of its length prior to insertion into the hem of the bag. This results in a tape with the same, or better, break strength as the original tape, but multiple times as long, so that a given weight of tape will make multiple times as many bags. The stretching results in orientation of the tape. In accordance with the invention, the tape is intermittently stretched so that portions of unstretched, unoriented, tape register with the sides of the bag. These portions are at the extremities of the draw tape where it is secured to the sides of the bag panel by heat sealing.

Stretching results in orientation of the polyethylene, which presents a major problem in that oriented tape cannot be heat sealed without significant weakening. The present invention overcomes this, by intermittently orienting the draw tape in register with the sides of the bag so that the tape remains unoriented, thick and wide at the side heat seal, and oriented everywhere else.

The invention also has advantages over the use of conventional oriented tape which is a different material than the bag material. The use of conventional, completely oriented tape, makes it necessary to punch a hole in the hem of the bag at the edges to allow the two strips of tape to come together without the presence of bag material which would prevent sealing because of the differences in material. In order to effectively seal oriented tape, the tape must be coated with a heat sealable material such as acrylic coating. The need for punching at the edges of the bag, or coating oriented tape is obviated in accordance with the present invention.

The foregoing and other objects, features and advantages of the invention will be better understood from the following more detailed description and appended claims.

SHORT DESCRIPTION OF THE DRAWINGS

FIG. 1 shows a series of bags with the draw tape of the present invention;

FIG. 2 is a cross-section on the line 2—2 of FIG. 1 showing the heat seal;

FIG. 3 shows the draw tape of the present invention;

DESCRIPTION OF THE PREFERRED EMBODIMENT

Figure 3A:
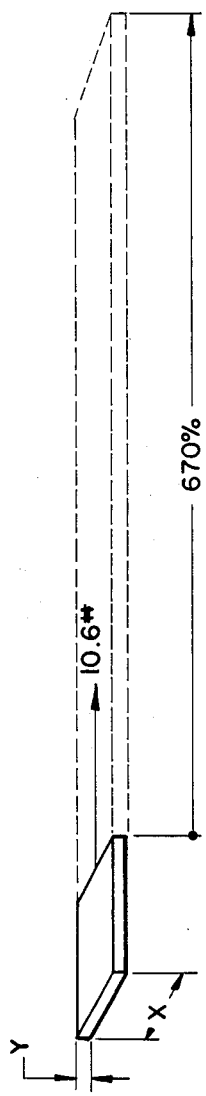
FIG. 3A depicts the stretch and break characteristics of linear low density polyethylene (LLDPE) tape.

Referring to FIGS. 1-3, a draw tape bag for carrying trash includes two panels 11 and 12. The two panels are formed from an extruded tube of polyethylene. The sides of the panels are heat sealed and cut from the tube at 13, 14 and 15 in a perpendicular direction. The tube is slit along the side 16 to form open tops in the bag for reception of trash and the like. Hem portions 17 and 18 of each panel are folded over adjacent the top. Draw tapes 19 and 20 are secured by the heat seal at the sides of the panels.

A cut-out 21 in each panel and hem portion at the middle of the bag, exposes the draw tapes so they can be grasped. When the bag is loaded with trash, the bag is grasped by the draw tape, thereby closing the bag. The draw tapes can thereafter be tied forming a neat bundle.

In accordance with the present invention, the draw tape has a relatively thin and narrow central portion 22 of stretched, oriented, polyethylene and end portions 23 at the extremities. The relatively thick and wide end portions are unstretched, unoriented, polyethylene tape. The heat seal which secures the draw tape to the sides of the panels is through the relatively thick and wide end portions 23.

FIG. 3A depicts the characteristics of the present commercially used LLDPE tape which has a width (X) of 1″ and a thickness of (Y) of 4 mils., giving it a cross-sectional area of 0.004 sq. inches. This tape requires 10.6 lbs. of force to fail, and it stretches 670%.

Figure 3B:
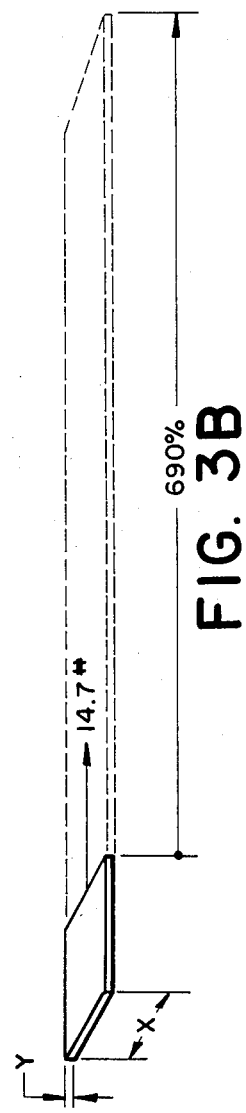
FIG. 3B depicts the stretch and break characteristics of high molecular weight, high density polyethylene (HMWHDPE) tape.

FIG. 3B depicts the stretch and break characteristics of HMWHDPE tape which has a width of 1″ and a thickness of 2 mils, giving a cross-sectional area of 0.002 sq. inches. This tape has a breaking point at 14.7 lbs., after having been stretched 690%.

Figure 3C:
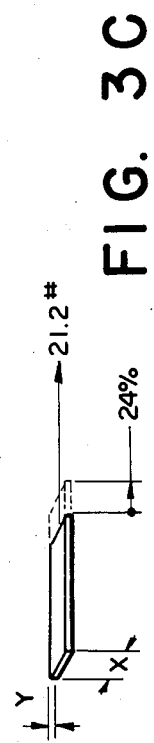
FIG. 3C depicts the stretch and break characteristics of oriented HMWHDPE tape.

FIG. 3C depicts the characteristic of HMWHDPE tape which has been stretched to 5 times its original length. After the stretching, the tape has a width of 0.447 inches and a thickness of 0.894 mils, giving a cross-sectional area of 0.0004 sq. inches. This stretched, oriented tape has a break point of 21 lbs., after having stretched only 24%. It can be seen that the stretched, oriented HMWHDPE tape has a higher break point and improved stretch characteristics in that excessive stretching of the draw tape is undesirable in these bags. Heat sealing of such oriented tape destroys the orientation and considerably weakens the tape at the point of the heat seal. However, this problem is obviated in accordance with the present invention, by providing the intermittent portions of unstretched tape where the heat seal occurs.

The HMWHDPE tape suitable for use in accordance with the present invention, is typically blown tubular film with a blowup ratio of 1.5:1. Resins suitable for making the film are available from Union Carbide, No. 6097 and from American Hoechst, No 9255. Tape suitable for use is available from Wright Plastics and from W. B. C. Extrusion Products. A sample of the tape from Wright Plastics had the following tested characteristics:

Modulus of Elasticity—21,000 psi
Yield Stress—3,710 psi
Ultimate Stress—8,100 psi
Elongation to Break—480%
Toughness—2340 ft. lbs per cu. in.
Thickness—2.02 mils.

Figure 4:
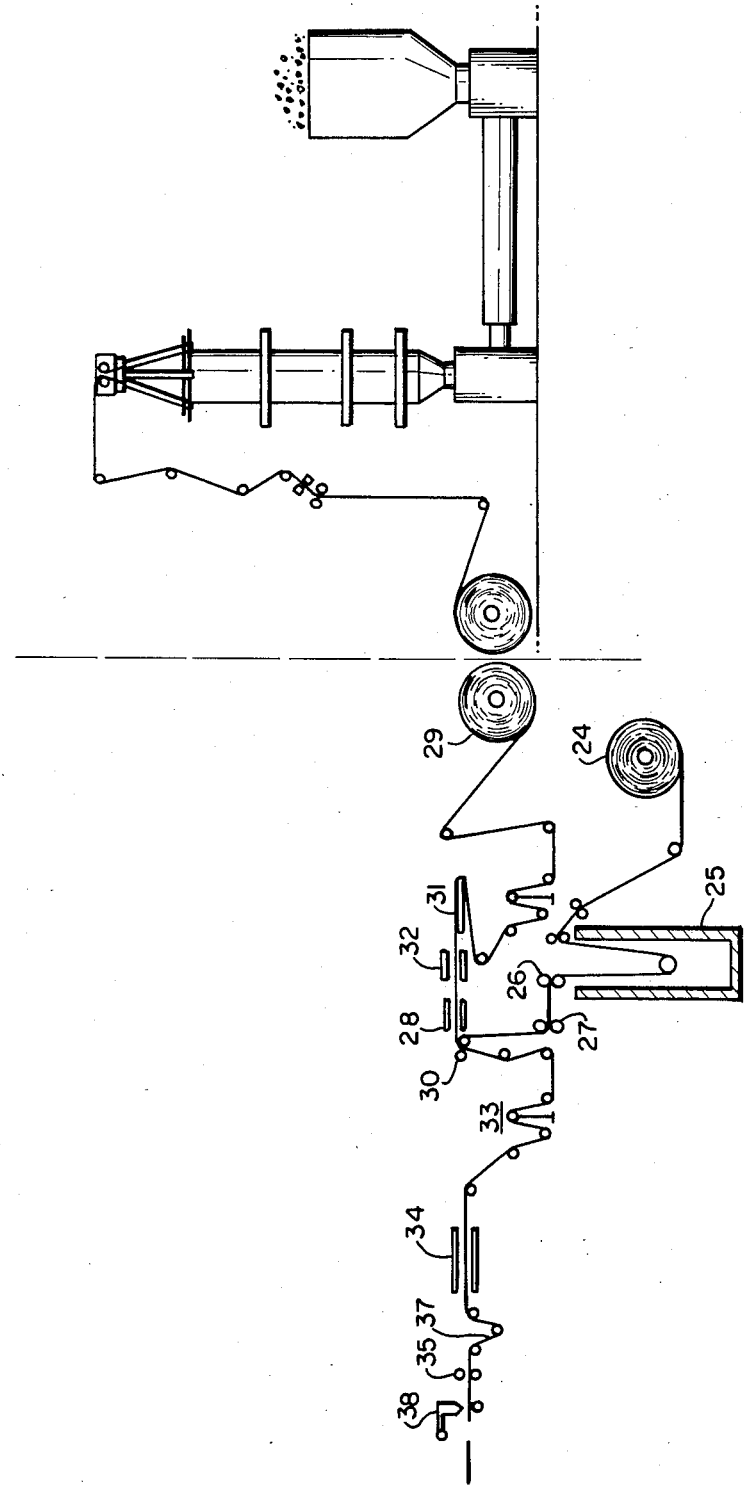
FIG. 4 depicts a manufacturing line for the bags and apparatus for intermittently stretching the draw tape prior to insertion into the bags.

FIG. 4 depicts the manner of intermittently stretching the draw tape prior to its insertion into the hem of the bag. LLDPE tape from the roll 24 is supplied to the furnace 25 where it is heated. The heated tape from the oven is intermittently stretched by a first pair of nip rollers 26 and a second pair 27. The pair of rollers 26 rotates at a slower speed than the second pair of rollers 27 in order to perform the stretching. In the exemplary embodiment, the first nip rollers 26 are feeding tape at 60 ft. per min. and the second pair of nip rollers 27 are feeding tape at 300 ft. per min. The intermittent stretching is performed by periodically releasing nip rollers 26, thereby producing the relatively thick and wide end portions of the tape. Alternatively, nip rollers 26 are accelerated, for example, to 300 ft. per min. feed, for short intervals of time to produce the thick and wide portions of the tape. The intermittently stretched tape is supplied to the tape inserter 28 which inserts it into the bag hem so that the thick and wide end portions are in register with the sides of the bag.

The remainder of the line for producing draw tape bags shown in FIG. 4 is more fully described in the aforementioned applications. Briefly, a roll 29 feeds a continuous, extruded tube of polyethylene which has been slit and folded along a median longitudinal line. The material is drawn from the roll 29 by pinch rollers 30. These draw the folded film, forming the two opposing panels, through a hemmer 31 and through a punch 32 which forms the cut-outs 21 in each panel. The continuous line of bags passes through the tape inserter 28 where the draw tape of the present invention is inserted into each hem of the bag.

The continuous length of film with the draw tapes inserted in the hem thereof is advanced from the pinch rollers 30, through rollers 33, and a hem sealer 34, by means of a second pair of pinch rollers 35. As the length of continuous hem sealed film exits the hem sealer 34, it passes through a "U-wrap" set of rolls 37, to the seal cutter assembly 38. The reciprocating heat seal bar carries a knife edge into contact with the moving web in an intermittent action timed to form a heat seal down the sides of each bag at regular intervals along its length. After bonding, the seal bar also severs the continuous length of film through the center of the heat seal, thereby separating individual bags from the continuous length of film.

While a particular embodiment of the invention has been shown and described, various modifications are within the true spirit and scope of the invention. The appended claims are, therefore, intended to cover all such modifications.

What is claimed is:

1. A draw tape bag for carrying trash and the like comprising:
   two panels forming an open top, closed bottom bag, said panels being joined along the sides of said bag;
   a hem of each panel being folded over adjacent said top, the bottom of each hem being secured to the adjacent panel;
   draw tapes in each hem secured at said sides to said panels, each of said draw tapes having:
   thick and wide end portions at the extremities where each draw tape is secured at said sides of said panels; and
   a relatively thin and narrow central portion between said end portions.

2. The draw tape bag recited in claim 1 wherein said central portion is stretched polyethylene and said end portions are unstretched polyethylene.

3. The draw tape bag recited in claim 2 wherein said central portion is oriented polyethylene and said end portions are unoriented polyethylene.

4. The draw tape bag recited in claim 1 wherein said draw tapes are secured at said sides of said panels by heat seals.

5. The draw tape bag recited in claim 1 wherein said panels are formed from a tube of extruded polyethylene, said tube being slit to form said open top for said bag, the sides of said panels being heat sealed and cut from said tube in a perpendicular direction.

6. The draw tape bag recited in claim 1 wherein said draw tape is high molecular weight, high density polyethylene tape.

7. The method of making draw tape bags for carrying trash and the like comprising:

extruding polyethylene to form two opposing panels with an open top and a closed bottom for each bag;

forming closed sides on said panels;

forming a hem of each panel folded over adjacent the top;

intermittently stretching polyethylene tape to form a relatively thin and narrow central portion between relatively thick and wide end portions;

inserting said tape into the hem of each panel;

heat sealing said tape to said sides of said panel through said thick and wide end portions of said draw tape; and securing the bottom of each hem to the adjacent panel after inserting said tape.

8. The method recited in claim 7 further comprising:

simultaneously seat sealing said sides of said panels during the heat sealing of said draw tape to said sides of said panels.

9. The method recited in claim 8 wherein the step of extruding forms a tube of polyethylene; and slitting said tube to form an open top in said bags.

10. The method recited in claim 9 further comprising:

cutting said panels from said tube in a perpendicular direction simultaneously with the steps of heat sealing.

11. The method recited in claim 7 wherein the step of intermittently stretching includes:

heating said draw tape; and intermittently stretching the heated tape between a first pair of nip rolls running at a relatively slow speed and a second pair of nip rolls running at a higher speed.

12. The method recited in claim 11 further comprising:

intermittently releasing one of said pairs of nip rolls to form thick and wide, unstretched, portions of said draw tape.

13. The method recited in claim 11 further comprising:

intermittently accelerating and decelerating said nip rolls to form unstretched end portions and stretched central portions in said tape.

14. The method recited in claim 7 wherein said draw tape is high molecular weight, high density polyethylene tape.

* * * * *